United States Patent [19]
Tuttle

[11] 3,988,869
[45] Nov. 2, 1976

[54] PANEL END STRUCTURE AND PANEL JOINT

[75] Inventor: Orvil Tuttle, Los Angeles, Calif.

[73] Assignee: Brunswick Corporation, Skokie, Ill.

[22] Filed: Dec. 12, 1974

[21] Appl. No.: 532,036

Related U.S. Application Data

[62] Division of Ser. No. 410,993, Oct. 30, 1973, abandoned.

[52] U.S. Cl.................................. 52/285; 52/584
[51] Int. Cl.²...................... E04B 1/00; E04B 5/00; E04B 7/00
[58] Field of Search................. 52/758 D, 580, 582, 52/584, 284, 285

[56] References Cited
UNITED STATES PATENTS

| | | | |
|---|---|---|---|
| 1,047,263 | 12/1912 | McMartin ........................ | 52/580 X |
| 2,321,566 | 6/1943 | Wilson .............................. | 52/580 |
| 2,394,443 | 2/1946 | Guignon ........................... | 52/580 |
| 3,323,265 | 6/1967 | Petersen .......................... | 52/584 X |
| 3,432,196 | 3/1969 | Marchiorello .................. | 52/758 D |
| 3,463,526 | 8/1969 | Benincasa et al................ | 52/282 X |
| 3,583,118 | 6/1971 | Lowery ...................... | 52/758 D UX |
| 3,722,704 | 3/1973 | Piretti ............................... | 52/284 X |
| 3,793,789 | 2/1974 | Greenamyer ..................... | 52/584 X |
| 3,921,355 | 11/1975 | Pennecot .......................... | 52/284 X |

Primary Examiner—Wayne L. Shedd
Attorney, Agent, or Firm—John G. Heimovics; David S. Guttman

[57] ABSTRACT

An end structure is provided for a panel having two metallic sheets separated by an insulating core, in which a portion of each of the metallic sheets extends beyond the insulating core to form sheet ends, a unitary metallic member is joined to one of the sheet's ends, and insulating means are provided to both thermally and electrically insulate the sheet ends from each other. The unitary metallic member has a joining surface including a flange designed to be fastened to a corresponding flange of a like panel end structure to form a joint which is recessed with respect to the metallic sheets, and which maintains thermal and electrical insulation between the two metallic sheets of each panel.

4 Claims, 6 Drawing Figures

PANEL END STRUCTURE AND PANEL JOINT

CROSS-REFERENCE TO CO-PENDING APPLICATION

This application is a divisional application of my co-pending application, Ser. No. 410,993, filed Oct. 30, 1973, now abandoned.

BACKGROUND OF THE INVENTION

1. Field of Use

While the panel end structure and panel joint of the present invention are subject to a wide range of applications, they are especially suited for use in the construction of modular buildings and containers, and will be particularly described in that connection.

2. Description of the Prior Art

The construction of buildings and containers from panels having metallic walls separated by a layer of insulation is well known. For example, U.S. Pat. No. 3,563,578 discloses such a structure. Typically, however, such structures partially defeat the purpose of the insulation by electrically and thermally shorting the inner and outer panel walls at the end of the panel, in order to form a joint. While this problem has been recognized in the prior art, the proposed solutions have resulted in panel end structures and joints of relatively complex construction extending well beyond the panel walls. For example, U.S. Pat. No. 3,217,455 shows an end structure for a modular panel and a joint for two panels utilizing that end structure which end structure and joint avoid the creation of a continuous metal path between the inner and outer metallic panel walls. However, the end structure described in U.S. Pat. No. 3,217,455 (1) requires the use of seven elements, making it relatively complex, (2) extends well beyond the panel outer wall, necessitating additional clearance for the resulting structure, and (3) relies primarily on a relatively flexible neoprene member to lend strength to the resulting joint. U.S. Pat. No. 3,670,466 also discloses an insulated panel end structure of a relatively complex nature, requiring the use of five elements, and extending well beyond the inner panel wall, thus detracting from the internal space of the resulting structure.

OBJECTS OF THE INVENTION

Thus, an object of the present invention is the provision of an improved panel end structure which maintains thermal and electrical insulation between the inner and outer metallic panel walls.

Another object of the present invention is the provision of an improved panel joint which maintains thermal and electrical insulation between the inner and outer metallic panel walls.

Another object of the present invention is the provision for providing EMI and RFI shielding for the panel structure.

A further object of the present invention is the provision of a panel end structure and a panel joint in which no element extends beyond the panel faces.

Another object of the present invention is the provision of a panel end structure and a panel joint which is impervious to moisture.

Yet another object of the present invention is the provision of a panel end structure and a panel joint of sufficient flexibility to distribute shock loads throughout the entire panel structure.

A still further object of the present invention is the provision of a panel end structure which enables a panel to be interchangeable with all other similar panels of the same or different thickness as long as the edges mate.

Another object of the present invention is the provision of an improved panel joint which is simple in construction, easy to assemble, and self-aligning.

SUMMARY OF THE INVENTION

The present invention provides an end structure for a panel having first and second generally parallel metallic sheets separated by an insulating core. A portion of each of the first and second metallic sheets extends beyond the insulating core to form first and second sheet ends. A unitary metallic member is joined to the first sheet end and insulating means are provided for thermally and electrically insulating the first metallic sheet from the second metallic sheet. The invention further provides a panel joint comprising two panel end structures, each as described above, and each further having a planar, complementary, self-aligning, joining surface formed from a portion of the unitary metallic member. Fastening means are provided for securely joining the self-aligning planar joining surfaces of the two panel end structures.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENTS

Figure 1:
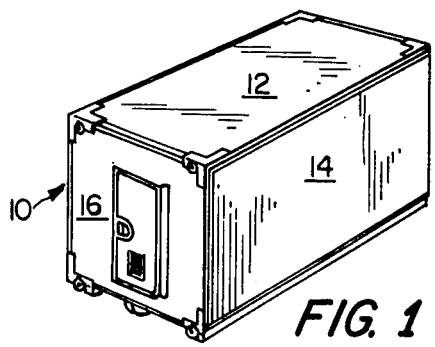
FIG. 1 is a perspective view of a building structure formed from a plurality of panels utilizing the end structure and joint of the present invention.

Referring to FIG. 1, a building structure 10 formed of a plurality of panels 12, 14, 16, etc. forming the top, side and front, respectively, of the structure, is illustrative of the type of strucutre that may be readily constructed utilizing the panel end structure and panel joint of the present invention.

Figure 2:
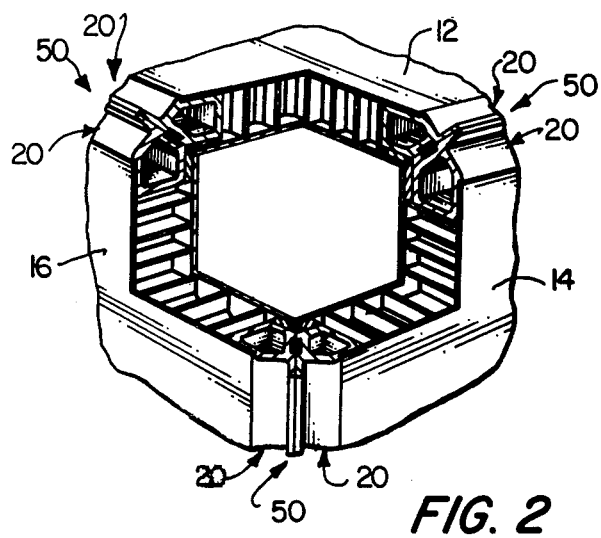
FIG. 2 is a perspective view of one corner of the building structure shown in FIG. 1, including a partial cutaway to show some of the details of the panel end structure and joint of the present invention.

From FIG. 2 it is apparent that each of the panels 12, 14 and 16 utilize the end structure 20 of the present invention on each of their four sides which, when joined, form the panel joints 50 of the present invention. It is further apparent that the end structures 20 are identical and therefore permit all panels of equal size to be readily interchanged. It is further contemplated that the panels 12, 14, 16, etc. may be of different thicknesses and the edges may be of different sizes but as long as the edges have mating surfaces the panels can be interchangeable.

Figure 3:
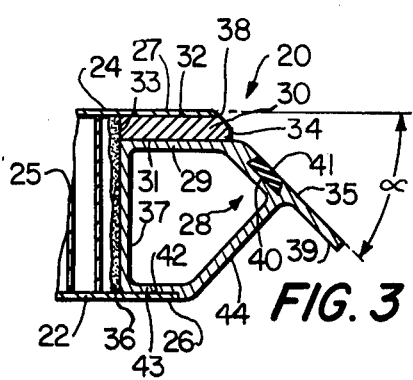
FIG. 3 is a detailed cross-sectional view of the panel end structure of the present invention.

Referring to FIG. 3, the panel end structure generally indicated at 20 will be described in detail. The panel includes an outer metallic sheet 22 forming an outer panel wall and an inner metallic sheet 24 forming an inner panel wall. The sheets 22 and 24 are preferably formed of 5052–H34 aluminum alloy; however, any sheet material of adequate strength could be used. The metallic sheet 22 and 24 are parallel and are separated by an insulating panel core material 25, which is preferably a resin impregnated paper-base honeycomb with hexagonal cells. Each of the metallic sheets 22 and 24 extends beyond the insulating core 25 to form sheet ends 26 and 27, respectively, which are part of the panel end structure. A unitary metallic member, generally indicated at 28, is joined preferably by bonding to the outer metallic sheet end 26. The member 28 is preferably made in the form of a tube of pentagonal cross-section of 6061T–6 extruded aluminum, although, again, any suitable strength material will suffice. Positioned between a second portion 29 of member 28 and the inner metallic sheet end 27 is a layer of thermal and electrical insulation 30 for thermally and electrically insulating the outer metallic sheet 22 from the inner metallic sheet 24. The layer of insulation 30 is preferably formed from a single phenolic strip, which not only provides excellent thermal and electrical insulation, but is also impervious to moisture and provides good resistance to shearing. The layer of insulation 30 has a first side surface 31 abutting the portion 29 of member 28, a second side surface 32 abutting the inner metallic sheet end 27, a third side surface 33 facing the interior of the panel and a fourth side surface 34 which is substantially coplanar with a self-aligning planar joining surface 35 of the unitary metallic member 28. A layer of foaming adhesive 36 abuts a third portion 37 of the unitary metallic member 28 and the third side surface 33 of the layer of insulation 30. The unitary metallic member 28 and the layer of insulation 30 are bonded in position at the time the panel is bonded, thus sealing the panel against moisture penetration. As an additional deterrent to the penetration of moisture, a layer of sealant material 38 is coated on the fourth side surface 34 of layer 30.

The self-aligning planar joining surface 35 extends outward from the unitary metallic member 28 to form a flange 39. The planar joining surface 35 forms an angle α with respect to the second metallic sheet 24. For forming structures as illustrated in FIG. 1 in the form of rectangular parallelepipeds, angle is 45°. However, if a structure of a different shape is desired, angle α may change accordingly. The planar joining surface 35 also contains a recessed portion 40 along its entire length. The recessed portion 40 is filled with a gasket 41 made of resilient material which projects beyond the surface 35 and assures a moisture free joint. The unitary metallic member 28 may further contain a recessed portion 42 inside portion 43 to receive the metallic sheet end 26. It is apparent from the drawing that the unitary metallic member 28 is formed in such a manner that sides 29 and 43 are parallel, side 37 is perpendicular to sides 29 and 43, the self-aligning joining surface 35 forms angle α with respect to side 29, and side 44 is perpendicular to the joining surface 35.

Thus, a panel end structure has been provided which is simple in construction but also strong, and which both thermally and electrically insulates the inner panel wall 24 from the outer panel wall 22 and at the same time being able to maintain electrical continuity of the inner and outer walls separately.

Figure 4:
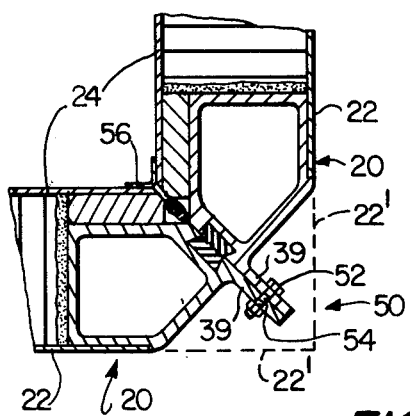
FIG. 4 is a detailed cross-sectional view of one embodiment of the panel joint of the present invention.

FIG. 4 shows how the end structure 20 of the present invention can be utilized to form a panel joint 50. By abutting the planar joining surfaces 35 of two panel end structures, all that need be added is a fastening means for securely joining the surfaces 35. In the embodiment shown in FIG. 4, the fastening means is a plurality of nuts and bolts 52 inserted through a plurality of holes 54 in flanges 39. It is important to note that if the planes of the outer metallic sheets 22 are projected as shown at 22', that the flanges 39 are contained well within these projections. Thus, the joint 50 in no way increases the dimensions of the structure in which it is utilized. Furthermore, since the bolts 52 are external of the structure in which they are utilized, the holes 54 need not be sealed. In addition, the joint 50 is quite flexible and will tend to distribute shock loads into the full panel structure, so that no one element is unduly stressed.

Should radio frequency interference (RFI) shielding be required, the metallic sheets 24 may be connected with an RFI tape or a thin aluminum angle 56. The gasket 41 can also be a composite material to provide electrical continuity between mating members so that EMI and RFI shielding can be effectuated on the exterior surface of the structure.

Figure 5:
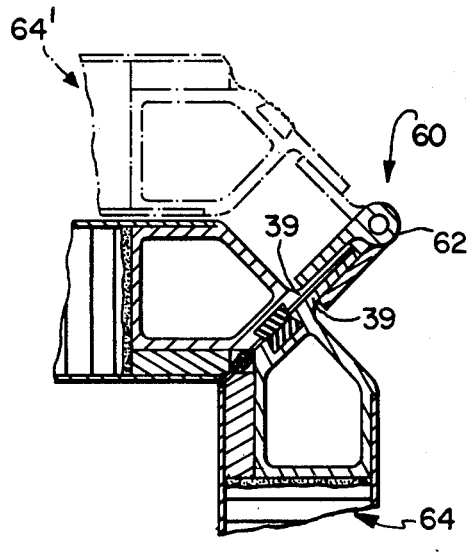
FIG. 5 is a detailed cross-sectional view of a second embodiment of the panel joint of the present invention.

FIG. 5 shows a second embodiment 60 of the panel joint of the present invention wherein the fastening means consists of a hinge 62 securely fastened to each of the flanges 39 to permit relative rotation between the two panels. Thus, a particular panel 64 may be rotated a full 270° to a position shown in phantom at 64'.

Figure 6:
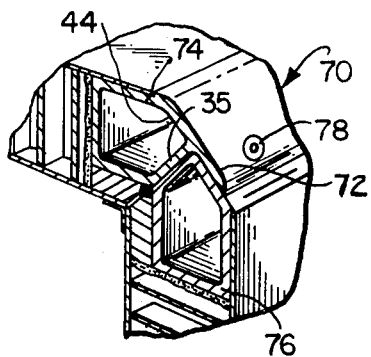
FIG. 6 is a detailed cross-sectional pictorial view of a third embodiment of the panel joint of the present invention.

FIG. 6 shows a third embodiment 70 of the panel joint of the present invention. Here the flanges 39 are absent from the end structures of both panels. However, one of the panels has a lip 72 attached to the unitary metallic member 74 and extending outward from it as an extension of side 44 perpendicular to the planar joining surface 35. The lip 72 overlaps a portion of unitary metallic member 76 and blind hole fasteners 78 securely fasten the lip 72 to the member 76. This embodiment has the advantage of further reducing the outside dimensions of the finished structure, but has the disadvantage that two different but cooperating end structures are required.

While there have been described what are at present considered to be the preferred embodiments of the present invention, it will be obvious to those skilled in the art that various changes and modifications may be made therein without departing from the invention; and it is, therefore, aimed in the appended claims to cover all such changes and modifications as fall within the true spirit and scope of the invention.

What is claimed is:

1. A joint for two panels each having first and second generally parallel metallic sheets separated by a thermally and electrically insulating core, the joint comprising:
   a. first and second panel end structures each comprising:
      1. a portion of each of said first and second sheets extending beyond said core to form first and second sheet ends;
      2. an elongated metallic unitary member having five planar sides in cross section, side 1 being parallel to side 3, side 2 connecting sides 1 and 3 and being perpendicular to side 1, sides 4 and 5 meeting sides 1 and 3 respectively at obtuse angles, side 4 meeting and being perpendicular to side 5, one of sides 4 or 5 having a planar self-aligning joining surface mateable with a similar surface on another similar unitary member, and a planar extension to the side having the self-aligning joining surface extending the joining surface beyond the junction of sides 4 and 5 and forming a flange mateable with a similar flange on another similar unitary member;
3. side 4 of the unitary member being joined to said first sheet end; and
4. insulating means for thermally and electrically insulating and mechanically joining side 5 of the unitary member from and to said second sheet end; and b. fastening means for securely joining the self-aligning planar joining surfaces of said first and second panel end structures.

2. A joint for two panels as set forth in claim 1 wherein each of said flanges contains a plurality of holes and said fastening means comprises a plurality of nuts and bolts, said bolts being positioned within said holes.

3. A joint for two panels as set forth in claim 1 wherein said first and second sheets are planar and wherein said flanges lie within the imaginary projections of the planes of said sheets.

4. A joint for two panels as set forth in claim 1 wherein said first and second sheets are planar and wherein said flanges lie within the imaginary projections of the planes of said sheets.

* * * * *